Feb. 10, 1959     R. N. HAYNIE     2,873,153

BEARING SHAFT SEAL

Filed June 29, 1956

2,873,153

BEARING SHAFT SEAL

Robert N. Haynie, Mountain View, Calif., assignor to Federal-Mogul-Bower Bearings, Inc., Detroit, Mich., a corporation of Michigan Application June 29, 1956, Serial No. 594,827

7 Claims. (Cl. 308—187.2)

This invention relates to an improved fluid seal. More specifically, it relates to a lubricant seal for use with ball bearings and the like.

In many ball bearing installations it is necessary to provide a seal between the inner and outer races of the bearing and another seal between the bearing assembly and an adjacent thrust part. Heretofore, these seals have been provided by separate elements of different types, such as a shaft seal for between the races and an O-ring for the thrust seal.

An important feature of the present invention is its provision of a single unitary device that seals both between the races and between the bearing assembly and the thrust member. The structure solves the dual sealing problem in ball bearing applications, reducing the costs of manufacturing, storing, stocking, and installing by using a single member instead of two separate members, while giving improved results.

Another problem solved by this invention has been the tendency of the race-sealing members to force the inner and outer races apart and out of alignment so that it will not function properly. Research has shown that the misalignment was caused by the press fit of the rigid metal reinforcing member that supported the resilient sealing lip and to use of a press fit of the sealing member in the bearing assembly. This invention solves the problem by providing a novel shape for the metal reinforcing element and by encasing it with rubber on all except one portion of its surface, the uncovered portion being a thrust surface adequately protected by two adjacent rubber-covered sealing portions. In this novel seal, rubber is interposed between each bearing race and the metal reinforcing member; the rubber covering can flow to accommodate the minor differences in size due to manufacturing tolerances instead of exerting a disruptive pressure upon the bearing assembly. In other words, the rubber covering flows to accommodate differences in the size of the metal reinforcing ring which necessarily occur due to inherent inaccuracies in metal-forming processes.

One object of the invention is therefore to provide an improved seal combining in an integral member the functions heretofore performed by two separate sealing members.

Another object of the invention is to provide a dual purpose oil seal capable of being manufactured easily and by simple processes.

Another object of the invention is to provide a ball bearing seal that is substantially rubber covered, a minimum amount of the metal reinforcing member being exposed and then only at a surface where its exposure performs a useful function.

Another object of the invention is to provide an oil seal of the type described which takes advantage of the accuracy inherent in some types of metal forming and minimizes the inaccuracies inherent in other types of metal forming.

Other objects and advantages of the invention will appear from the following description of a preferred embodiment.

Figure 1:
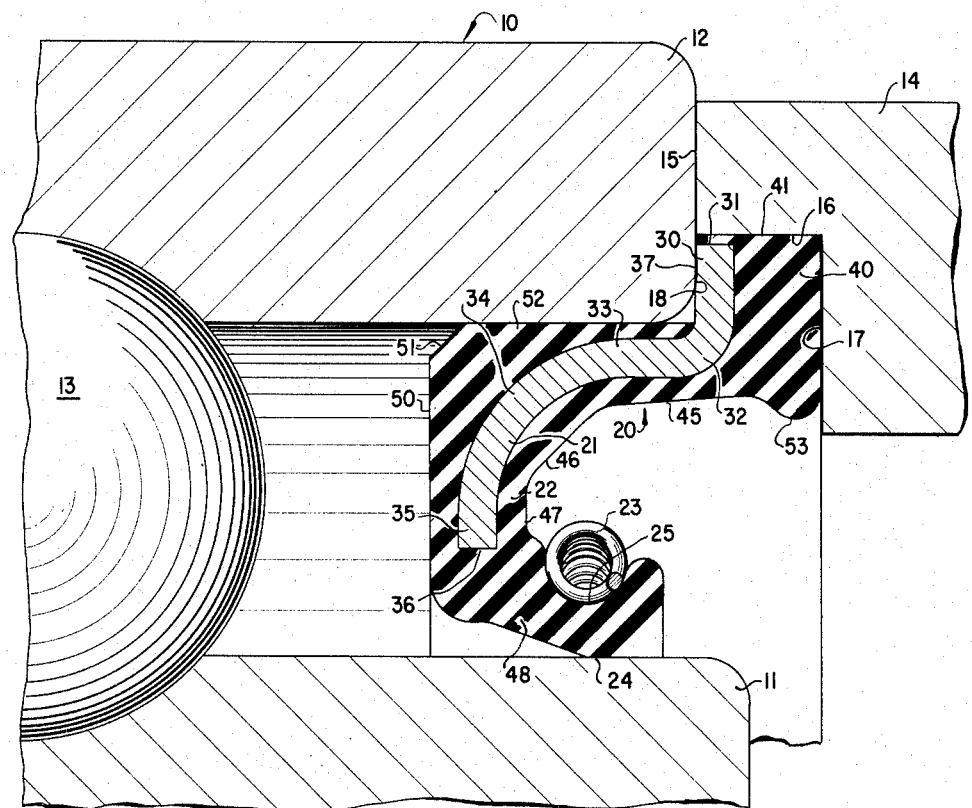
Fig. 1 is a view in elevation and in section of a portion of a ball bearing assembly and installation for an automoble rear axle, incorporating a fluid seal embodying the principles of this invention.

In the device shown in Fig. 1, the ball bearing assembly 10 comprises an inner race 11, an outer race 12, and a series of balls 13. The bearing assembly 10 is installed against a thrust member 14 having an end surface 15 and a step providing a cylindrical shoulder 16 and a radial shoulder 17. It is desired to seal against lubricant leakage between the radial surface 18 of the outer bearing race 12 and the shoulders 16 and 17 of the thrust member 14, as well as between the inner and outer races 11, 12.

The seal 20 incorporates three principal elements: an annular metal reinforcing member 21, an elastomeric sealing element 22, which also encases the metal ring 21, and a garter spring 23. In a manner familiar to those experienced in oil seals, the garter spring 23 exerts a light radially inward pressure on the sealing lip 24 sufficient to hold it in place and provide for its proper interference with the inner race 11. The garter spring 23 is preferably located in a groove 25 provided in the molded rubber element 22 opposite the lip 24.

The metal reinforcing member 21 is formed to provide a radial outer flange 30 extending from an outer periphery 31 to a corner 32 where it meets an axially extending portion 33. The portion 33 leads to a radially inwardly curved portion 34 which terminates in a radial inner portion 35 with a pierce 36. The radial outer flange 30 is used to locate the metal member 21 in the mold when the rubber covering 22 is molded, since its outer periphery 31 is made by cutting, and cutting is the most accurate operation in the process of forming the metal member 21. The present invention takes advantage of this accurate outer periphery 31 and the accuracy of the radial face 37 of the flange 30, while utilizing the rubber covering 22 to compensate for the higher tolerances inherent in forming the metal member 21 with corners and curves.

The element 22, preferably made from oil-resistant elastomer, includes a thickened radial portion 40 on the opposite side of the metal flange 30 from the bare locating face 37. This thickened portion 40 has a cylindrical or axial outer periphery 41, a radial face 42, and a chamfer 43 joining the radial face 42 to the outer periphery 41 and aiding in locating the seal 20 during installation. A sharper diagonal face 44 extends radially and axially inwardly from the radial face 42 to a generally frusto-conical portion 45 on the inner side of the metal member 21. The portion 45 leads into a shorter sharper frusto-conical portion 46 opposite the metal portion 34, and this in turn leads to a radial portion 47 that merges into the lip portion 48, radially inwardly of the pierce 36 of the metal member 21.

On the outer side of the metal member 21, the synthetic rubber member 22 has a radial face 50 which is joined by a chamfer 51 to a cylindrical or axial periphery 52 comprising the minor outer diameter of the sealing element 20.

When the seal 20 is installed, the thick portion 40 is compressed as shown in Fig. 1, so that its radial face 42 is forced a substantial distance toward the metal radial flange 30, with the result that the rubber flows or is deformed into the shape shown, where, instead of having the slope 44, there is actually a bump 53 extending radially inwardly. As will be evident, a very tight sealing action between the radial face 42 and the shoulder 17 is obtained. The press fit of the major axial periphery 41 against the shoulder 16 is also very tight, as is the press fit of the minor outer axial periphery 52 against the outer race 12. Since the rubber can flow to accommodate tolerances in the bearing design, it will seal with the correct amount of pressure at both these locations. The radial uncovered face 37 of the metal member 21 acts as a stop member giving very positive control and assuring compression of the rubber portion 40 opposite it.

Figure 2:
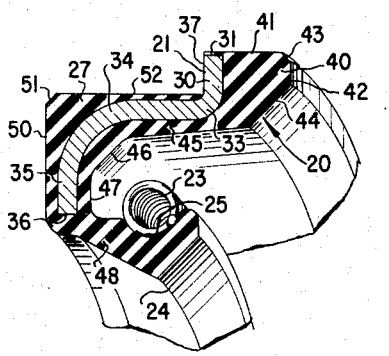
Fig. 2 is a cross-sectional view of the sealing element of Fig. 1 prior to its installation.
Figure 3:
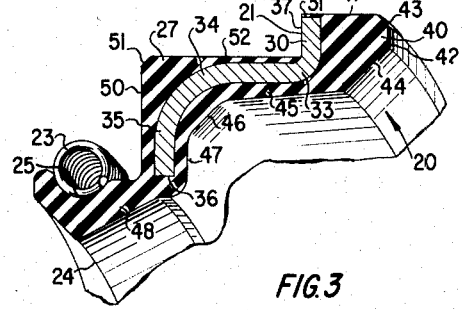
Fig. 3 is a view like Fig. 2 of a modified form of sealing element in which the lip is reversed in comparison with the device of Figs. 1 and 2.

The modified form of the invention shown in Fig. 3 differs principally by having the sealing lip 24 on the opposite side of the metal radial flange 35; in all other particulars it has substantially the same structure and the same effect in operation as the design shown in Figs. 1 and 2.

To those skilled in the art to which this invention relates, many additional changes in construction and widely differing embodiments of the invention will suggest themselves without departing from the spirit and scope of the invention as defined in the claims.

What is claimed is:

1. A fluid seal, including in combination: a metal ring having an outer radial flange and an inner radial flange connected by a generally axially extending portion; a resilient member bonded to and covering said metal ring except for one face of said outer radial flange on the side nearer said inner flange and having a thickened portion covering the opposite face of said outer radial flange and extending beyond the outer periphery thereof, with chamfered edges adapted to serve as a thrust seal, said resilient member having a portion providing a sealing lip lying radially inwardly from said inner radial flange and axially toward said outer flange; and a garter spring urging said lip radially inwardly.

2. A fluid seal, including in combination: a metal ring having an outer radial flange with an outer periphery and one bare radial face, a generally axially extending portion, and a radial inner portion with a pierce therethrough; a rubber member substantially covering said metal ring except for said bare face, said rubber member having, on the side opposite said bare face, a thickened portion whose outer periphery lies beyond the metal outer periphery and covers it, a radial face parallel to and distant from said outer radial flange and joined by a chamfer to said outer rubber periphery, said thickened portion being adapted to serve as a thrust seal and so adapted for flow under compression; said rubber member also having a lip portion and extending radially inwardly and axially away from said metal ring, radial inner portion, said lip portion having a sealing lip and a spring-receiving groove in the face opposite said lip; and a garter spring seated in said groove.

3. A fluid seal, including in combination: a metal ring having an outer radial flange with an outer periphery and one bare radial face, a generally axially extending portion, a radially inwardly curved portion, and a radial inner portion with a pierce therethrough; an elastomeric member substantially covering said metal ring except for said bare face, said elastomeric member having, on the side opposite said bare face, a thickened portion whose outer periphery lies beyond the metal outer periphery and covers it, a radial face parallel to and distant from said outer radial flange and joined by a chamfer to said outer elastomeric member's periphery, said thickened portion serving as a thrust seal flowable under compression; said elastomeric member also having a lip portion supported by the radial inner portion of said metal ring, said lip portion having a sealing lip, said elastomeric member having an axial peripheral portion of smaller diameter than said elastomeric member's said outer periphery covering said metal ring's generally axially extending portion.

4. A fluid seal, including in combination: a metal ring having an outer radial flange with an outer periphery and a bare radial face, a generally axially extending portion integral therewith and forming a corner with the inner end of said radial flange, a radially inwardly curved portion extending from the opposite end of said axial portion and terminating in a radial inner portion with a pierce therethrough; a rubber member substantially covering said metal ring except for said bare face, said rubber member having, on the side opposite said bare face, a thickened portion whose outer periphery lies beyond the metal outer periphery and covers it, a radial face parallel to and distant from said outer radial flange and joined by a chamfer to said outer rubber periphery, a first frusto-conical portion extending radially inwardly and axially in the direction toward said metal face at a relatively great angle to the axis of said seal, an axially longer second frusto-conical portion inclined to said axis at a smaller angle and extending from the radially-inward end of said first frusto-conical portion beyond said metal radial flange and covering the inner side of said metal ring axially extending portion for substantially its entire length; a more sharply inclined frusto-conical portion extending from the end thereof, and a radial portion parallel to the radial portion of said metal ring; a lip portion joined to said rubber radial portion and extending radially inwardly beyond said metal ring, said rubber member having a radial face on the opposite side of said metal ring and an axial peripheral portion of smaller diameter than said rubber outer peripheral portion, joined to said radial face by a chamfer; and a garter spring seated in said rubber lip portion opposite said lip.

5. A ball bearing installation, comprising an inner race and an outer race, said outer race having a radial thrust face; balls between the races; a thrust member with a thrust face bearing against said bearing thrust face and having a recess on its radially inner side providing a radial shoulder spaced from its said thrust face and an axial shoulder connecting said radial shoulder and its said thrust face; and a fluid seal having a metal ring with an outer radial flange and an inner radial flange connected by a generally axially extending portion, and having a resilient member covering said metal ring except for one face of said outer radial flange resting against said bearing thrust face inwardly of said thrust member's thrust face, said resilient member being provided with a thickened portion on the opposite face of said outer radial flange adapted to serve as a thrust seal compressed between said radial shoulder, said axial shoulder, and said bearing's thrust face, said resilient member having a portion providing a sealing lip radially inwardly from said inner radial flange in sealing contact with said inner race.

6. A ball bearing installation, comprising: an inner race and an outer race, said outer race having a radial thrust face; balls between the races; a thrust member with a thrust face bearing against said bearing thrust face and having a recess on its radially inner side providing a radial shoulder spaced from its said thrust face and an axial shoulder connecting said radial shoulder and its said thrust face; and a fluid seal having a metal ring with an outer radial flange and an inner radial flange connected by a generally axially extending portion, and having an elastomeric member covering said metal ring except for one face of said outer radial flange resting against said bearing thrust face inwardly of said thrust member's thrust face, said elastomeric member being provided with a thickened portion on the opposite face of said outer radial flange adapted to serve as a thrust seal compressed between said radial shoulder, said axial shoulder, and said bearing's thrust face, said elastomermic member having a portion providing a sealing lip radially inwardly from said inner radial flange in sealing contact with said inner race and an axial portion lying over said metal ring axially extending portion in sealing contact with said outer race and flowable to compensate for manufacturing tolerances so as to provide a tight seal without misaligning the bearing races.

7. In a ball bearing installation having an inner race and an outer race, said outer race having a radial thrust face, balls between the races, and a thrust member with a thrust face bearing against said bearing thrust face and having a recess on its radially inner side providing a radial shoulder spaced from its said thrust face and an axial shoulder connecting said radial shoulder and its said thrust face; the combination therewith of a fluid seal having a metal ring with an outer radial flange and an inner radial flange connected by a generally axially extending portion, and having a resilient member covering said metal ring except for one face of said outer radial flange resting against said bearing thrust face inwardly of said thrust member's thrust face, said resilient member being provided with a thickened portion on the opposite face of said outer radial flange adapted to serve as a thrust seal compressed between said radial shoulder, said axial shoulder, and said bearing's thrust face, said resilient member also having a portion covering the outer side of said metal ring's axially extending portion in press-fit sealing contact with said outer race and a portion providing a sealing lip radially inwardly from said inner radial flange in sealing contact with said inner race.

References Cited in the file of this patent

UNITED STATES PATENTS

| 2,164,380 | Boyd | July 4, 1939 |

FOREIGN PATENTS

| 669,500 | Great Britain | Apr. 2, 1952 |
| 899,777 | Germany | Dec. 17, 1953 |